Patented Feb. 16, 1954

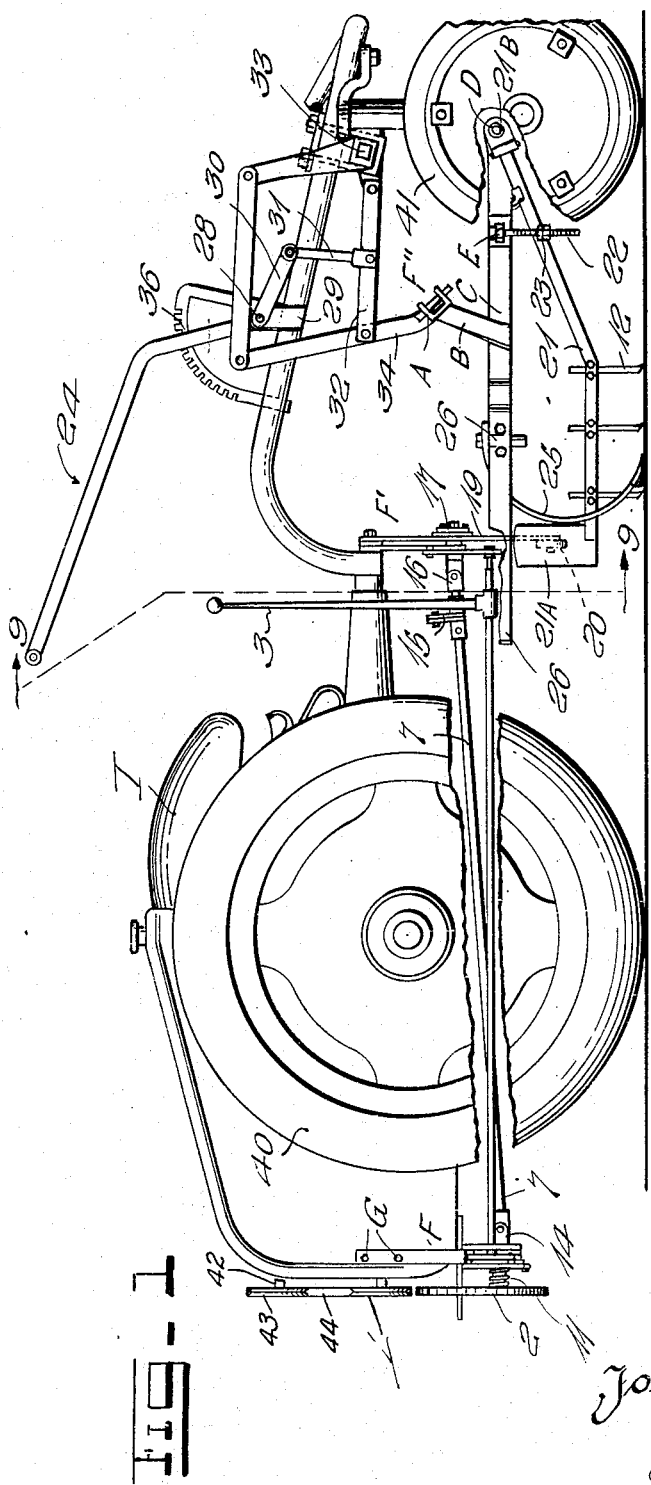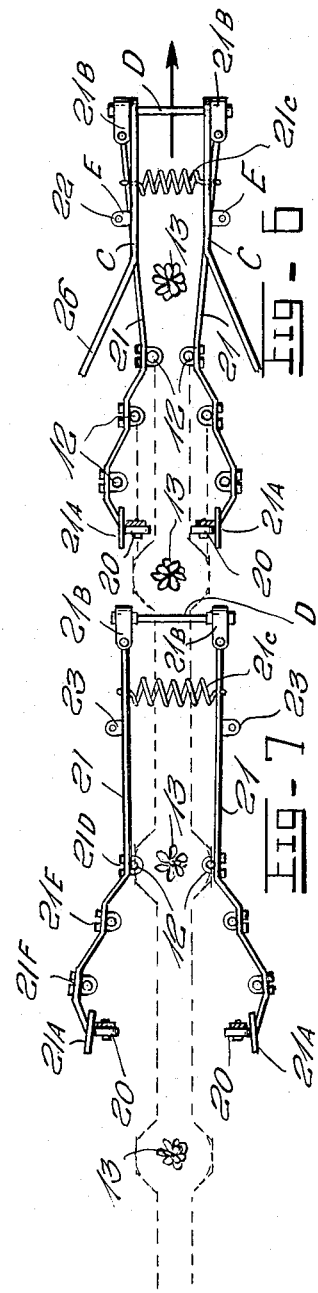

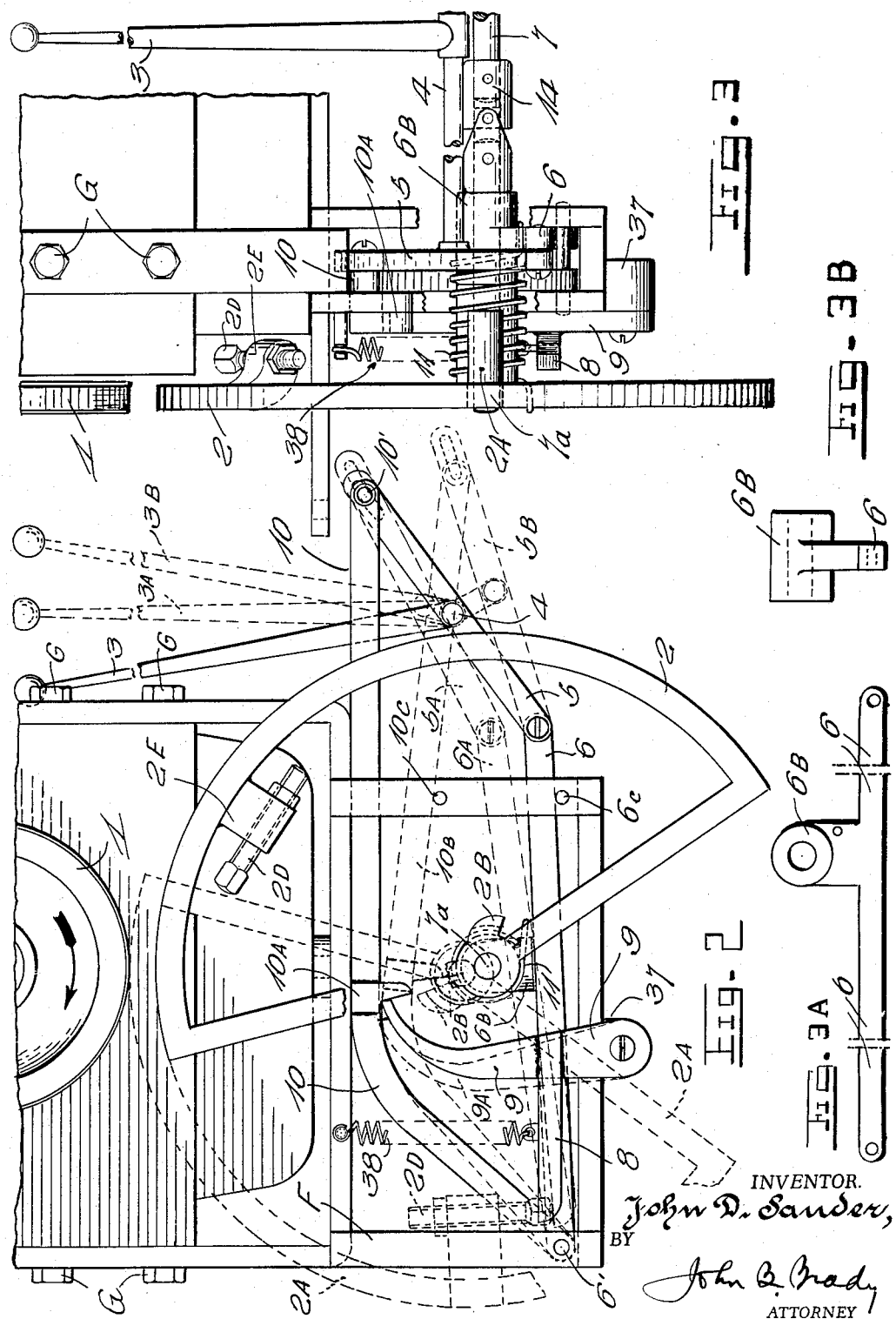

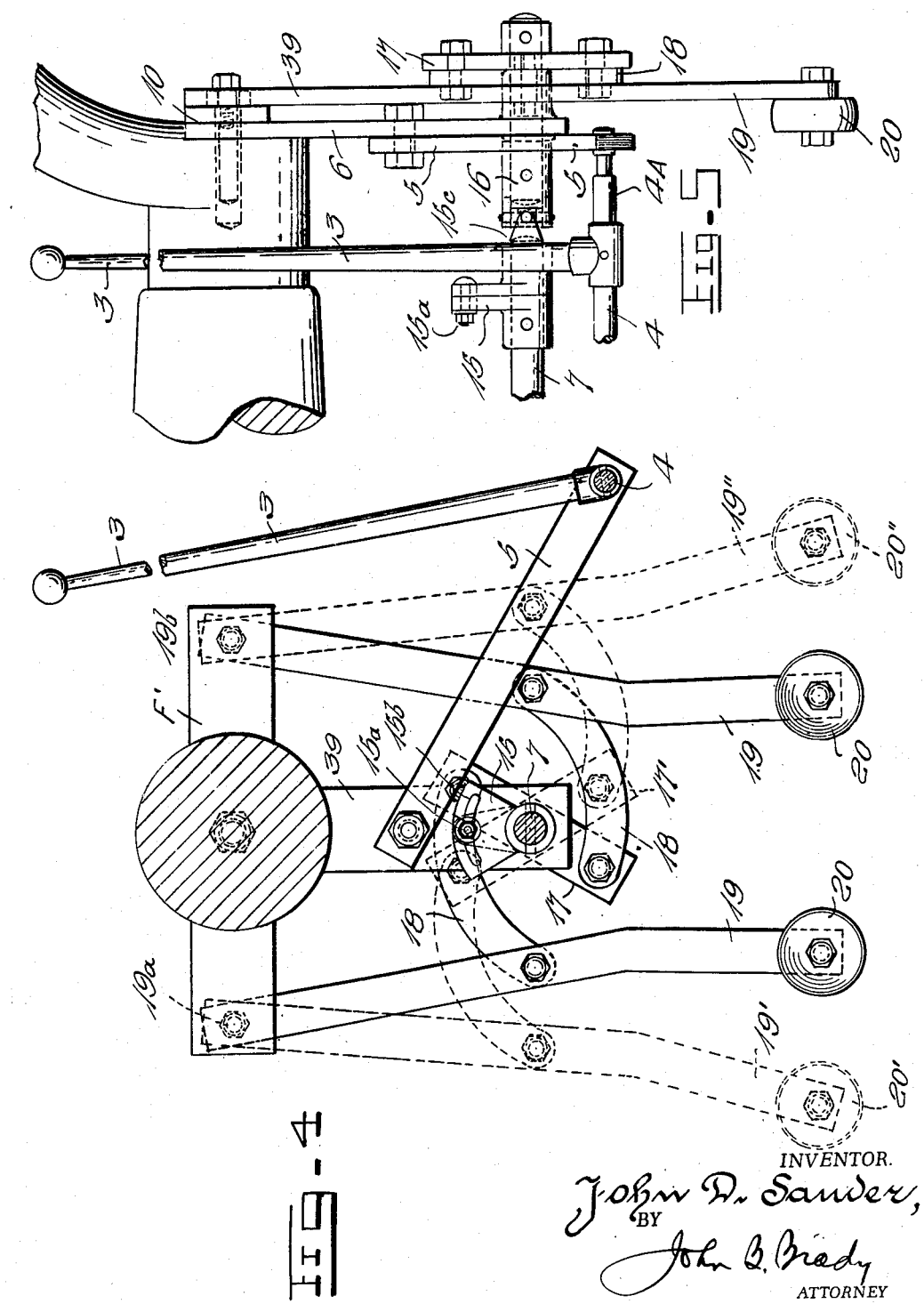

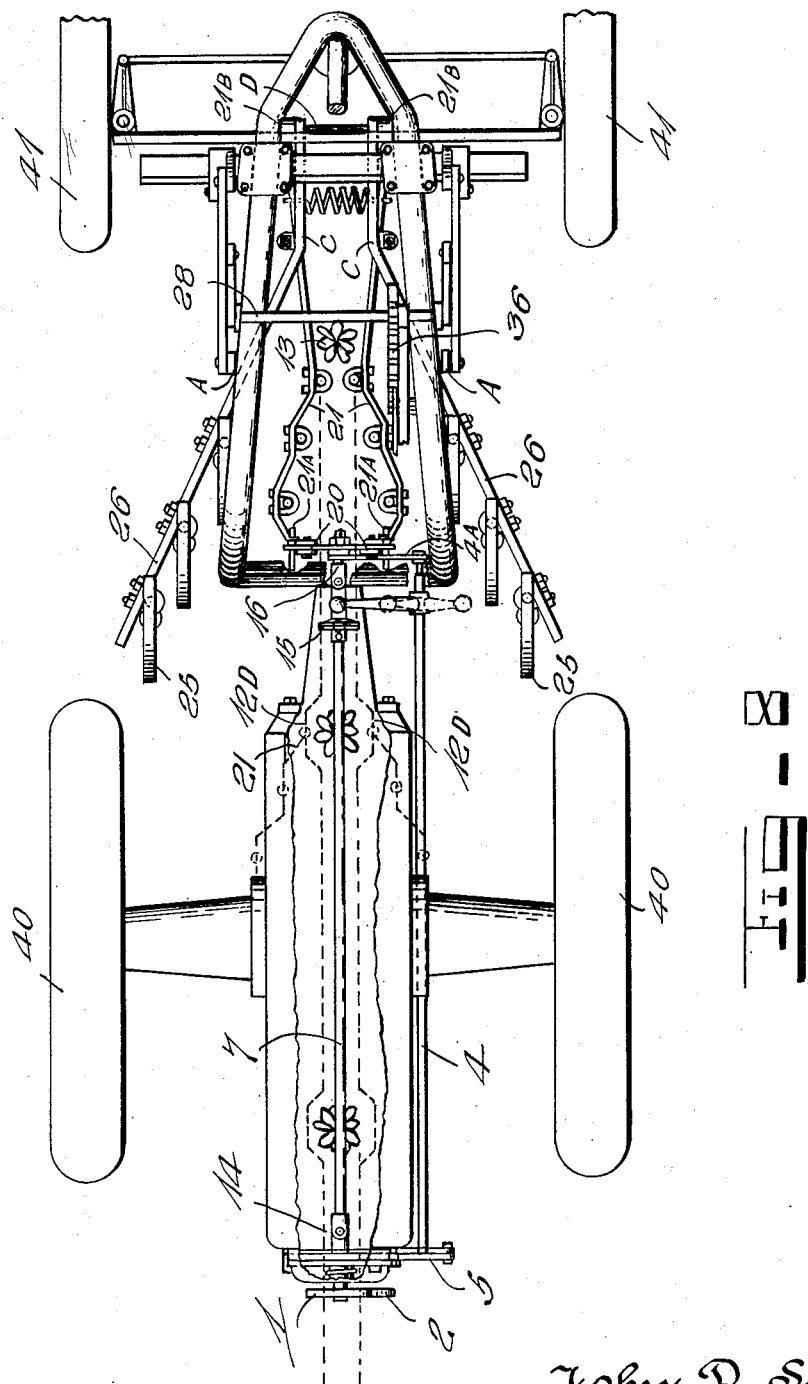

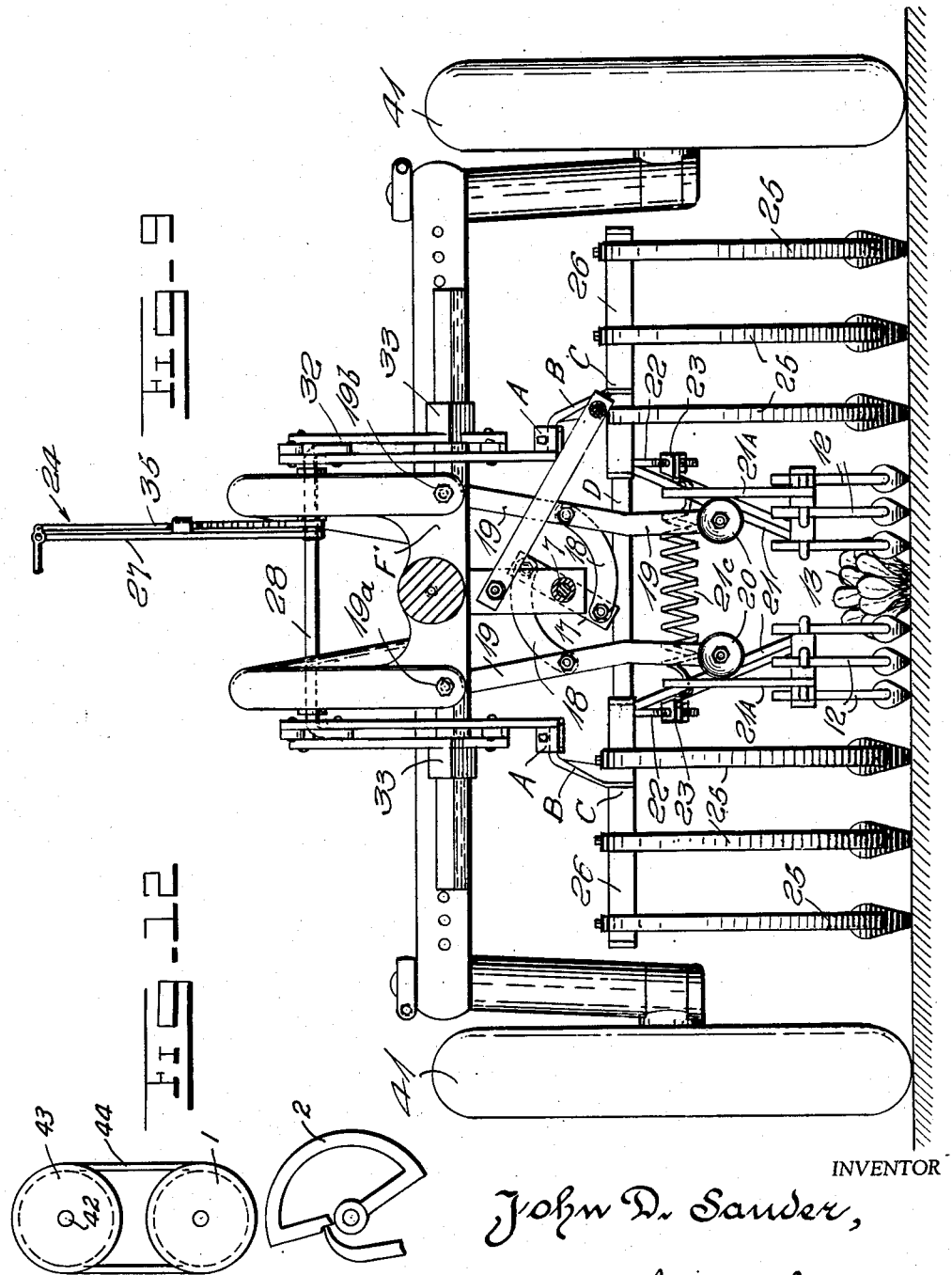

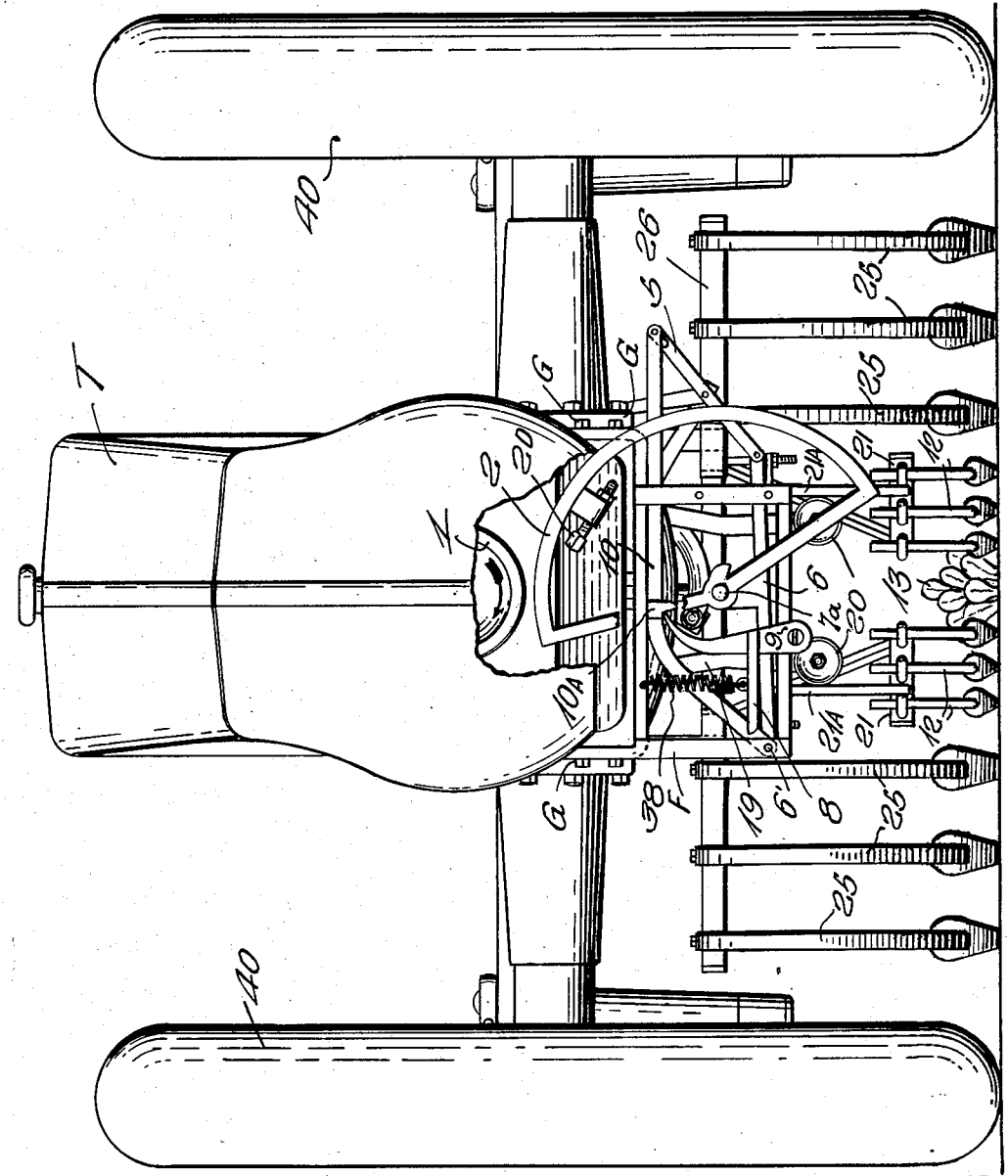

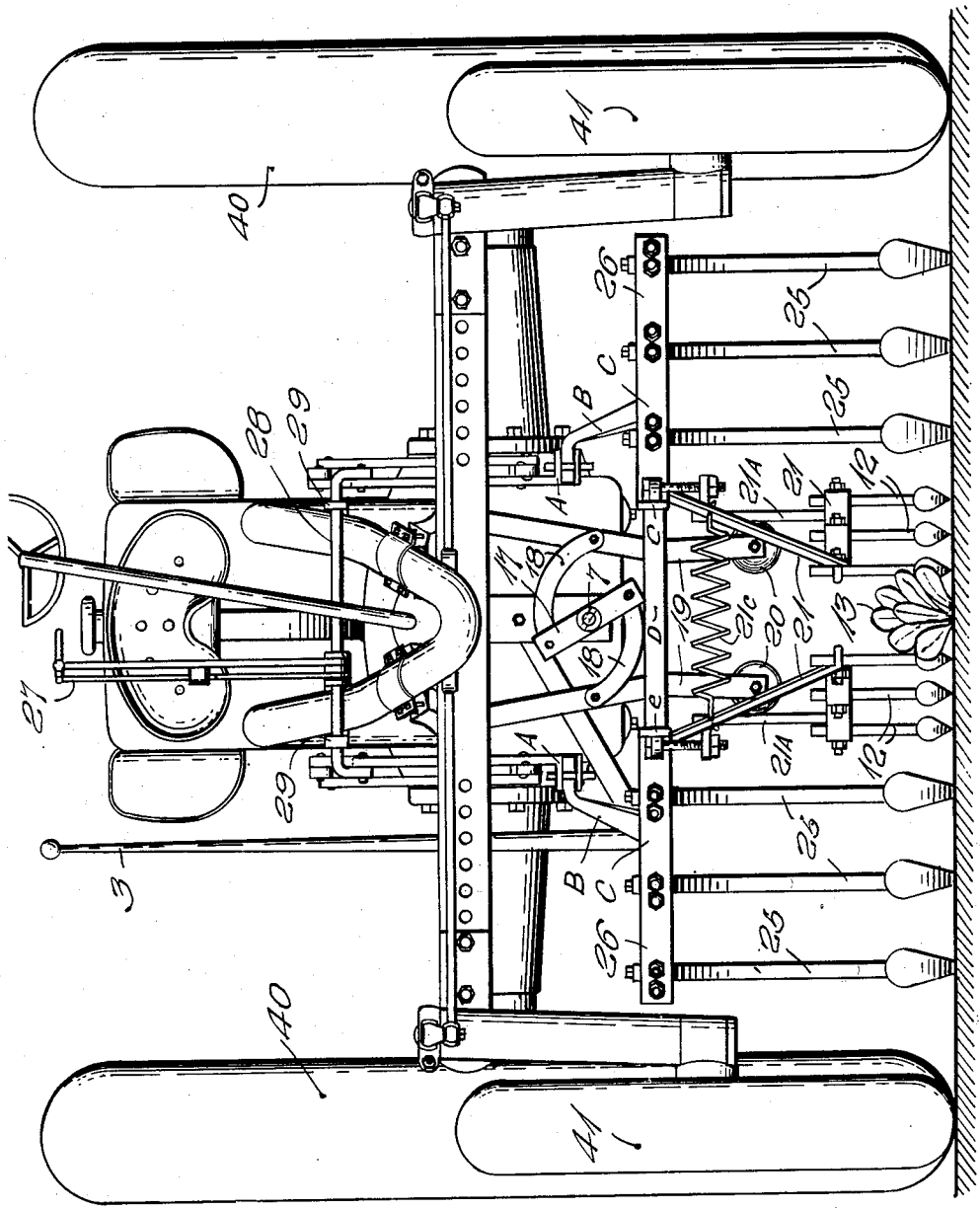

2,669,170

UNITED STATES PATENT OFFICE 2,669,170

POWER-ACTUATED HOEING EQUIPMENT

John D. Sauder, Oyster Point, Pa.

Application January 9, 1950, Serial No. 137,532

12 Claims. (Cl. 97—46.33)

My invention relates broadly to agricultural equipment, and more particularly to a power driven hoeing device for facilitating cultivating operations.

One of the objects of my invention is to provide a construction of power driven hoeing device in which the plants in a crop row may be efficiently cultivated by means of a tractor driven implement, thereby decreasing labor costs in the essential cultivation of crops.

Another object of my invention is to provide a power driven hoeing device which may be readily mounted on a tractor and controlled by the operator of the tractor for cultivating individual plants in a crop row as the tractor advances along the crop row.

Still another object of my invention is to provide a construction of power driven hoeing device for operation by a tractor, in which the tractor operator has direct control of the movement of a plurality of hoes with respect to the plants of a crop row along which the tractor advances for cultivating the plants in a manner which completely protects the individual plants.

Still another object of my invention is to provide a construction of mechanism for attachment to a tractor for imparting movement to a multiplicity of hoeing devices at selected intervals controlled by the operator of the tractor for cultivating the plants in a crop row.

Other and further objects of my invention reside in a compact and simplified mechanism for attachment to tractors for operating a multiplicity of hoes, as set forth more fully in the specification hereinafter following by reference to the accompanying drawings, in which:

Figure 1 is a side elevational view of the power driven hoeing device of my invention, showing the hoeing device mounted on a tractor; Fig. 2 is a rear elevational view of the driving unit for the hoeing device; Fig. 3 is a side elevational view of the driving unit shown in Fig. 2; Fig. 3A is a front elevational view of the bearing in which the operating sector shown in Fig. 2 is mounted; Fig. 3B is a side elevational view of the bearing as shown in Fig. 3A; Fig. 4 is a rear elevational view of the spreader mechanism for the hoeing arms, and illustrating the manual control thereof; Fig. 5 is a fragmentary side elevational view of the spreader mechanism illustrated in Fig. 4; Fig. 6 is a fragmentary plan view showing the hoeing arms in closed position for effecting a cultivating operation along a crop row, and between individual plants in the row; Fig. 7 is a view similar to the view illustrated in Fig. 6 but showing the hoeing arms moved to spread position for cultivating around an individual plant in a crop row; Fig. 8 is a plan view of a tractor with the hoeing devices of my invention installed thereon and illustrating the arrangement of the hoeing devices with respect to the frame of the tractor; Fig. 9 is a transverse sectional view taken substantially on line 9—9 of Fig. 1; Fig. 10 is a rear elevational view of the tractor showing the arrangement of the hoeing units and the actuating mechanism associated therewith; Fig. 11 is a front view of the tractor with the hoeing units mounted thereon and showing the position of the hoeing units as the tractor advances along the crop row; and Fig. 12 is a fragmentary view showing the manner of driving the sector from the driving belt of the tractor.

My invention is directed to a construction of power driven hoeing device which may be readily mounted on a tractor and operated from power delivered by the tractor for selectively cultivating individual plants of a crop row as the tractor advances along the crop row. My invention provides for controlled movement of a plurality of hoes as the tractor advances along the crop row, whereby the hoes may be moved to a position immediately around the plant or spread to a position remote from the plant for cultivating between the plants in the crop row and cultivating immediately around the plant without injury to the plant, as the tractor advances along the crop row. The mechanism of my invention provides for a positive spreading of the hoeing devices by power delivered by the tractor, and the restoration of the hoeing devices under spring control after the hoes pass around the individual plant. The spring mechanism restores the hoeing devices to normal position under selective control of the same manual means which is employed for effecting the operation of the positive spreading mechanism for the hoeing devices. Thus, movements of the hoeing devices may be obtained automatically which simulate a manual hoeing operation, with the saving in labor costs by reason of the more rapid and thorough cultivation which may be effected in a crop row.

Referring to the drawings in more detail, reference character 1 indicates the power take-off pulley or V-belt wheel of the tractor T, which is continuously driven, and with respect to the periphery of which the sector 2 of the control mechanism of my invention, illustrated more clearly in Figs. 2, 3 and 10, is presented for imparting movement to the hoeing devices. The main power shaft of the tractor T is represented at 42 as shown in Fig. 12, driving pulley 43 which has a V-groove in its periphery for receiving and driving the drive belt 44 which drives the power take off pulley 1. The sector 2 is frictionally engaged at its periphery by belt 44 moving in the V-groove of power take off pulley 1. An auxiliary manually controlled hand lever 3 is mounted on the tractor adjacent the operator's seat, and which is movable from position 3 to position 3A or 3B illustrated in Fig. 2 for effecting a spreading or a retracting of the hoeing devices. Reference character 4 designates a shaft to which the hand lever 3 is fixed and which is moved as hand lever 3 is moved. The shaft 4 is connected to bar 5 through stub shaft 4A. Bar 5 is fixed to bar 6 pivotally mounted at 6' on the frame F attached to the tractor through suitable means such as G. Movement of hand lever 3 to dotted line position 3A results in the movement of bars 5 and 6 to dotted line position 5A and 6A in Fig. 2. Bar 6 carries the sector shaft bearing 6B shown more clearly in Figs. 3A and 3B, the sector shaft bearing being welded to bar 6. Movement of bar 6 to position 6A lifts the sector shaft bearing 6B to dotted line position shown in Fig. 2. The sector 2 is carried by shaft 7A which is journalled in sector shaft bearing 6B, and, when the sector shaft bearing 6B is lifted to dotted line position illustrated in Fig. 2, the periphery of the sector 2 establishes contact with the periphery of the continuously rotating power take off pulley 1, whereby counter-clockwise movement is imparted to sector 2 so that sector 2 is positively driven to the dotted line position 2A in Fig. 2. Shaft 7A imparts movement to shaft 7 through universal joint 14, shown more particularly in Figs. 1 and 3.

Bar 17, shown more clearly in Figs. 4 and 5, is secured to shaft 7, and as shaft 7 is angularly moved in a counterclockwise direction, bar 17 is turned to the dotted line position 17', as shown in Fig. 4, imparting movement through curved links 18 to the spreader arms 19. This operation throws the spreader arms 19, which are pivotally mounted at 19a and 19b to forward frame F' of the tractor, to the dotted line positions 19' and 19'', as shown in Fig. 4. In order to initially set the position of the spreader arms 19, I provide a spacing quadrant 15, associated with bar 17 and links 18 and depending frame member 39. By adjusting one section of the quadrant 15 to the right or to the left, the spreader arms 19 may be brought closer or moved further apart, to properly position the spreader arms 19 for operation of the hoeing devices on large or small plants in the crop row. By orientation of the spacing quadrant 15 and the selective fixing thereof by means of adjustable bolt member 15A operating in arcuate slot 15B, the spreader arms 19 may be selectively set in proper spacial relation. The spacing quadrant does not change the amount of movement of the spreader arms 19, but does control the initial setting from which the spreading operation is commenced, and to which position the spreader arms 19 are restored at each operation of the hand lever 3. The spacing quadrant substantially spreads the shaft 7 from an operating stub shaft 15C which connects through the universal joint 16 with the bar 17.

The spreader arms 19 carry rollers 20 on the ends thereof which move to positions 20' and 20'' shown in Fig. 4, as the spreader arms 19 are moved apart. These rollers 20 contact vertical plates 21A which are secured to hoeing arms 21 of the hoeing device. The hoeing arms 21 are supported in swivel mountings 21B which are supported on cross-shaft D mounted between beams C carried by the tractor frame. The beams C have lugs E thereon, as shown more particularly in Fig. 1, from which swivelly mounted screws 22 depend and pass through lugs 23 on the hoeing arms 21 for permitting the hoeing arms to be adjusted in vertical position about cross-shaft D as a center, while not interfering with the transverse spread of the hoeing arms in the course of the movement of the hoeing arms transversely of the crop row. This is accomplished by providing socketlike heads on the depending screws 22 and universal movable lugs 23 on beams 21, so that hoeing arms 21 are free to separate and are confined only with respect to the level in which the arms operate beneath the longitudinally extending beams C.

The master manually actuated lifting device 24 is mounted on the frame of the tractor, as represented more particularly in Figs. 1, 9 and 11, and serves to raise and lower the hoeing arms 21 when it is desired to bodily lift the hoeing devices represented at 12 from the ground, or adjust the hoeing devices 12 with respect to the depth of cultivation. The manually actuated lifting device 24 is operated to elevate hoeing devices 12 from the ground when cultivation directly in the crop row may not be desirable, and cultivation restricted to opposite sides of the crop row by means of hoeing devices represented at 25, mounted on outwardly extending beams 26, carried by beam C.

The manual actuated lifting device 24 consists of a lever 27 secured to cross-shaft 28, mounted in bearing plates 29. The shaft 28 is attached to levers 30, which connect through links 31 fastened to one side of the substantially trapezoidally shaped adjusting frame 32. The substantially trapezoidally shaped adjusting frame 32 is pivotally supported with respect to transverse frame bar 33, carried by the frame of the tractor. Substantially trapezoidally shaped frame 32 has depending arms 34 thereon, which carry laterally extending lugs A thereon, which establish connection with arms B leading to the cultivator beam C. Thus, beam C may be raised or lowered about cross-shaft D as a center, and maintained in adjustable position by engagement of detent 35 in the sector 36 of the manually actuated lifting device 24. The ends of the beam C, and the outwardly extending ends 26 thereof, are free to move vertically without obstruction with respect to the frame of the tractor in effecting a lifting operation. The hoeing arms 21 are maintained under spring tension by means of coil spring 21C, which tend to draw hoeing arms 21 against rollers 20 of spreader arms 19, with the vertically extending plates 21A in contact with rollers 20. By reason of the continuous spring tension exerted by coil spring 21C between hoeing arms 21, the hoeing devices 12 follow the movements of spreader arms 19 to a contracted or a projected position in accordance with the position of spreader arms 19 under control of hand lever 3.

The operation of sector 2 under control of power take off pulley 1 has heretofore been alluded to somewhat briefly. Referring again to Figs. 2 and 3, it will be observed that frame F also supports a journalling means 37 for a pawl 9 which carries a bar 8 thereon. Bar 8 extends in a plane offset from the substantially parallel plane of sector 2, and projects in the path of the adjustable stop 2D carried by the inwardly extending lug 2E on sector 2. The adjustable stop 2D makes contact with the bar 8 at one limit of rotation of sector 2A, as shown in dotted lines in Fig. 2. The frame F also provides a pivotal mounting for a bar 10, pivotally mounted at 6' coaxially with the pivotal mounting of bar 6 heretofore described. The bar 10 is curved throughout one portion thereof, and extends in a linear path throughout another portion thereof, and provides a pin and slot connection 10' with the bar 5, as shown. The bar 10 has a detent 10A secured thereon at the position which is substantially the juncture of the curved portion of the bar and the linear portion thereof. This detent extends downwardly and forms an abutment against which the end of pawl 9 is adapted to engage in the full line position illustrated in Fig. 2, prior to the imparting of movement to sector 2.

The bars 5, 6 and 10 are so positioned that they enclose in their normal position, illustrated in Fig. 2 in outline, the substantially trapezoidally shaped figure which is under continuous spring tension by means of coil spring 38 connected between a point on frame F and the bar 8, tending to urge pawl 9 into latched abutment with detent 10A, as shown in full lines in Fig. 2.

Referring again to the sector 2, it will be observed that the hub of sector 2 is provided with a clutch lug 2B extending therefrom. Clutch lug 2B normally clears the depending end of the detent 10A in the full line position of the part shown in Fig. 2. However, when shaft 7 carrying the sector shaft bearing 6B is raised by movement of hand lever 3 to position 3A, bars 5 and 6 move to the positions illustrated by dotted lines 5A and 6A, thereby raising the hub of the sector and the clutch lug 2B to a position engaging the depending end of the detent 10A, which drops to the dotted line position with bar 10B and with the pawl 9 moved to position 9A by abutment of adjustable stop 2D with bar 8. When the hand lever 3 is moved to position 3B, the low point of detent 10A is maintained in the path of clutch lug 2B on the hub of the sector, thus holding the sector 2 and all the associated controlling elements, including the hoeing arms 21 and hoes 12, in position for safely passing an individual plant. The moment the hoes are clear of the plant the operator shifts the lever from position 3B to 3, which returns bars 5, 6 and 10 to their original positions and disengages clutch lug 2B from detent 10A, thus allowing coil torsional coil spring 11, shown more clearly in Fig. 3, to return sector 2 to its original position, which drives all the parts controlling the hoeing arms and the hoes to their original or closed position. This completes a full cycle of the hoeing operation.

The operator of the tractor having full view of the plants in the crop row as the tractor advances along the crop row, is able to impart power to the hoeing devices 12 at the proper moment to control the movement of hoeing arms 21 and the hoeing devices 12 carried thereby, as represented in Fig. 6, for properly treating the individual plants which I represent at 13 in the crop row. It will be observed that the hoeing device arms 21 are substantially linear and parallel throughout a portion of their length from the swivel connections 21B thereof with cross shaft D. However, throughout the balance of the length of the hoeing arms the hoeing arms are widened step by step with respect to each other, as represented at zone 21D, 21E and 21F, so that the hoeing devices 12 are disposed in echelon for properly pulverizing the soil around the individual plants.

Tractor T is of a conventional type having rear wheels 40 and front wheels 41 carried by the chassis, which is arranged to support the three sections of the frame of the attachment, which I have represented at F, F' and F''. The parts are assembled in such manner that the spreading and returning movement of the hoeing devices is carried out with precision and, as heretofore observed, the initial spacing of the hoeing devices on opposite sides of the crop row may be selectively set for plants of varying growths and sizes, at the different seasons of the year.

I have selected a sector as part of the driving mechanism in the structure of my invention, as the spreading operation of the longitudinally extending beams can be most effectively carried out by such arrangement. That is to say, positive application of the driving force from V-belt wheel 1 is effective only during a limited period determined by the periphery of the sector 2, but extends over a sufficient time period to effect a spreading operation of the beams which are then restored to retracted position preparatory for the next control of the spreading operation.

Throughout the specification and claims I have referred to V-belt wheel 1 merely for the purpose of making it clear that sector 2 is driven by wheel 1 as shown in Fig. 12 through frictional contact with belt 44. It should be understood, however, that wheel 1 may be the conventional pulley driven by a tractor. In this instance the sector 2 is merely pressed against the face of the V-belt in securing the driving force for the spreader mechanism of my invention.

I have found the power driven hoeing equipment of my invention highly practical and successful in operation, and while I have described my invention in one of its preferred embodiments, I desire that it be understood that no limitations upon my invention are intended other than may be imposed by the scope of the appended claims.

What I claim as new and desire to secure by Letters Patent of the United States, is as follows:

1. A power driven hoeing device comprising a frame structure, a power driving shaft having a V-belt wheel thereon journalled in said frame structure and engaged and driven by a belt, a sector having angular sweep motion journalled in said frame structure in substantially coplanar relation to said V-belt wheel and operative to establish driven relation with the belt in said V-belt wheel, a pair of vertically pivoted beams carried by said frame structure, hoeing devices supported by said beams, means for shifting said sector into driving relation to the belt of said V-belt wheel, and means driven by said sector for imparting transverse displacement to said beams in proportion to the angular sweep of said sector.

2. A power driven hoeing apparatus comprising a frame structure, a rotatable V-belt wheel journalled in said frame structure and engaged and driven by a belt, a sector journalled in said frame structure, means for selectively moving said sector into contacting relation with said belt for imparting movement to the sector, a shaft driven by said sector, a pair of spreader arms controlled by said shaft, a pair of longitudinally extending beams disposed in spaced relation and swivelled with respect to said frame structure, hoeing devices carried by said beams, and means connected with said beams and operated by said spreader arms under control of said shaft for effecting a spreading of said hoeing devices in accordance with the movement of said sector.

3. Agricultural apparatus comprising a mobile frame structure, a pair of longitudinally extending beams swivelly connected at one end with said frame structure, a multiplicity of hoeing devices supported by the remote ends of said beams, a pair of spreader arms pivoted to said frame structure and depending downwardly toward said beams, vertically extending plates projecting from said beams in overlapping relation with the depending ends of said spreader arms, spring means for yieldably maintaining said beams in a predetermined minimum spacial relation, means located between said spreader arms and slidably engaging said plates for imparting movement to said plates and said spreader arms and means for angularly moving said last mentioned means for applying lateral pressure against said vertically extending plates and transversely displacing said plates and the beams and the hoeing devices associated therewith to a predetermined maximum spacial relation for effecting a cultivating operation around plants in a crop row.

4. Agricultural apparatus as set forth in claim 3 in which the depending ends of said spreader arms carry rollers which roll in contacting relation with the vertically extending plates carried by said beams as the hoeing devices move over irregular terrain, for effecting a spreading and retracting operation of said hoeing devices irrespective of the irregularity of the terrain over which the hoeing devices operate.

5. Agricultural apparatus as set forth in claim 3 in which the means for angularly moving the means for imparting movement to said spreader arms includes an angularly movable bar connected at opposite ends with a pair of arcuate shaped links which connect with said spreader arms and in which movement is imparted to said bar from a power driven unit.

6. Agricultural apparatus as set forth in claim 3 in which the remote ends of said beams have a step by step formation whereby the beams are transversely separated in increasing widths for supporting the hoeing devices in echelon arrangement for effecting cultivation around the plants in a crop row in a multiplicity of differently spaced paths.

7. Agricultural apparatus as set forth in claim 3 in which said beams are vertically adjustable with respect to said frame structure for controlling the depth of penetration of said hoeing devices in the earth with respect to the plants of a crop row, the overlapping relation of said spreader arms and the vertically extending plates being such that such spreader arms remain between said plates throughout the range of the adjustments of said beams with respect to said frame.

8. Agricultural apparatus as set forth in claim 3 in which said beams are located between sets of fixedly spaced hoeing devices carried by said frame structure and with respect to which the hoeing devices carried by said beams are transversely displaceable on each side of the plants in a crop row.

9. Agricultural apparatus as set forth in claim 3 including means for initially setting the minimum and maximum spread to which said spreader arms may be displaced.

10. Agricultural apparatus comprising in combination with the frame of a mobile unit, a drive shaft terminating in a rotary driven wheel, a sector, a control shaft carrying said sector, means for journalling the control shaft of said sector whereby said sector is disposed in a position coplanar with said wheel for displacement toward and away from said wheel, manual means for shifting said sector into engagement with the periphery of said wheel for imparting angular movement to said sector, a pair of longitudinally extending beams pivotally mounted at one end with respect to said frame and carrying hoeing devices on the remote ends thereof, a pair of spreader arms pivoted on said frame and depending downwardly therefrom in positions between said longitudinally extending beams, means interconnecting said spreader arms and said control shaft and controlled by said sector whereby said spreader arms impart transverse movement to said beams for spreading said beams, and spring means for restoring said beams upon discontinuance of driving forces imparted by said sector.

11. Agricultural apparatus comprising in combination with a mobile chassis, a frame structure, a rotatable driven wheel journalled on said chassis, a sector, a control shaft carrying said sector, lever means for manually displacing said sector into and out of the path of said driven wheel whereby said driven wheel may impart movement to said sector, a pair of longitudinally extending beams swivelly supported with respect to said frame structure, hoeing devices carried by said beams, spreader arms pivoted on said frame and depending downwardly therefrom in positions between said beams and means interlinking said spreader arms and said control shaft and controlled by said sector whereby said spreader arms displace said beams and correspondingly move said hoeing devices, and latching means associated with said sector for maintaining said sector in predetermined relation to said driven wheel.

12. Agricultural apparatus as set forth in claim 11 in which said latching means includes a pawl and detent mechanism in which the position of said pawl is controlled by the movement of said sector and in which the position of said detent is controlled by the movement of said lever means for controlling the movement imparted to said beams.

JOHN D. SAUDER.

References Cited in the file of this patent

UNITED STATES PATENTS

| Number | Name | Date |
|---|---|---|
| 1,107,864 | Sturgiss | Aug. 18, 1914 |
| 2,521,549 | Smith | Sept. 5, 1950 |